United States Patent [19]

Hait

[11] Patent Number: 4,501,392
[45] Date of Patent: Feb. 26, 1985

[54] TORQUE DRIVEN IRRIGATION SYSTEM

[76] Inventor: James M. Hait, 8047 Chardonay Ct., San Jose, Calif. 95135

[21] Appl. No.: 554,659

[22] Filed: Nov. 23, 1983

Related U.S. Application Data

[62] Division of Ser. No. 374,566, May 3, 1982.

[51] Int. Cl.³ .............................................. B05B 3/00
[52] U.S. Cl. ................................. 239/177.1; 74/142; 239/710; 239/721
[58] Field of Search .............. 239/177, 191, 192, 710, 239/716, 721; 74/47, 142

[56] References Cited

U.S. PATENT DOCUMENTS

| | | | |
|---|---|---|---|
| 2,610,424 | 9/1952 | Millard | 74/47 |
| 3,538,941 | 11/1970 | Bates | 239/715 |
| 4,067,497 | 1/1978 | Cornelius | 239/177 |
| 4,354,636 | 10/1982 | Hait | 239/177 |

FOREIGN PATENT DOCUMENTS 217436  5/1958  Australia .

Primary Examiner—Jeffrey V. Nase
Assistant Examiner—Jon M. Rastello
Attorney, Agent, or Firm—Lloyd B. Guernsey; H. M. Stanley; R. B. Megley

[57] ABSTRACT

A rotary irrigation system comprises a continuous length of irrigation pipe having sprinkler heads spaced along the length thereof with an inboard end of the irrigation pipe connected to a fixed upstanding water supply pipe and with an outboard end of the irrigation pipe connected to power apparatus for rotating the outboard end of the pipe about the axis of the irrigation pipe. The inboard end of the irrigation pipe is connected so it cannot rotate about the axis of the irrigation pipe, but can move about the water supply pipe. The irrigation pipe is supported at uniformly spaced intervals along its length by a plurality of wheels with the wheels having hubs which receive the irrigation pipe and allow the wheels to rotate in one direction only. The power apparatus applies a torque to rotate the outboard end of the irrigation pipe in a first direction to wind up the pipe. The power apparatus then allows the irrigation pipe to unwind in the opposite direction and to rotate the wheels to advance the irrigation pipe around the water supply pipe. Apparatus is provided for insuring that the irrigation pipe unwinds by a predetermined amount each time so the wheels rotate and advance the irrigation pipe in uniform incremental distances.

3 Claims, 10 Drawing Figures

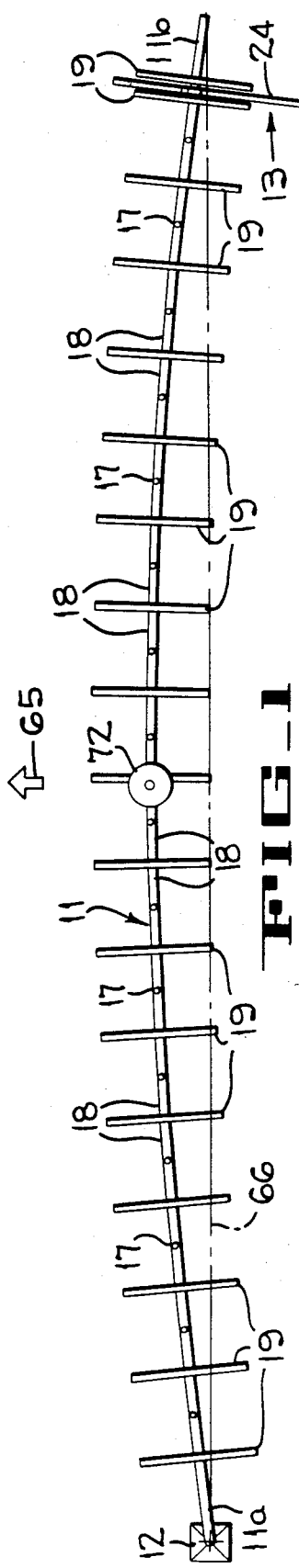
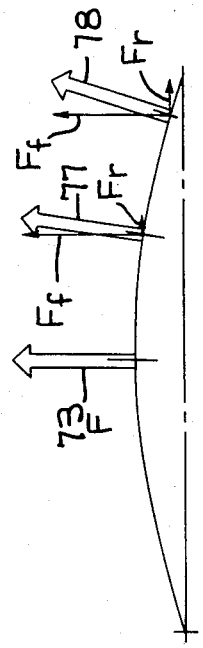
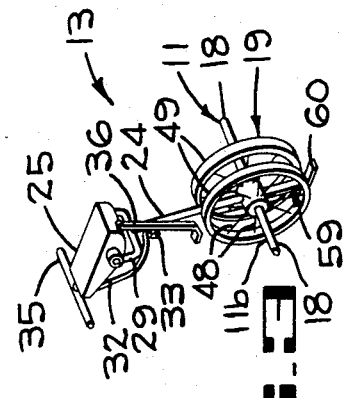
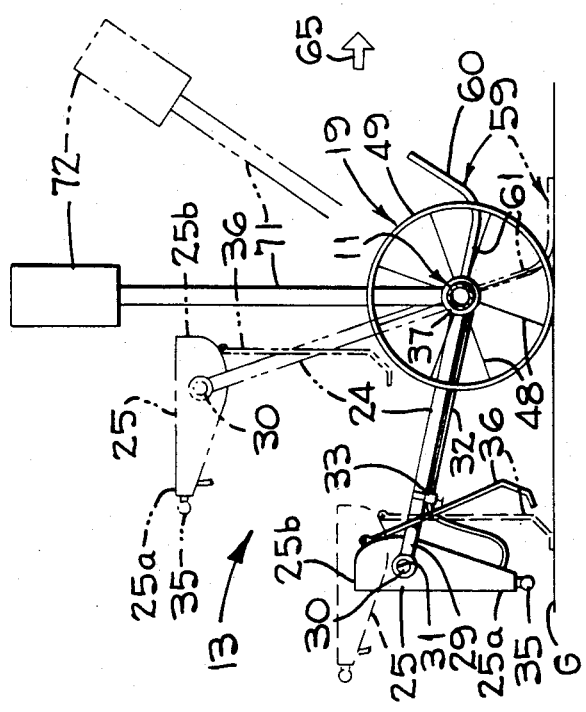

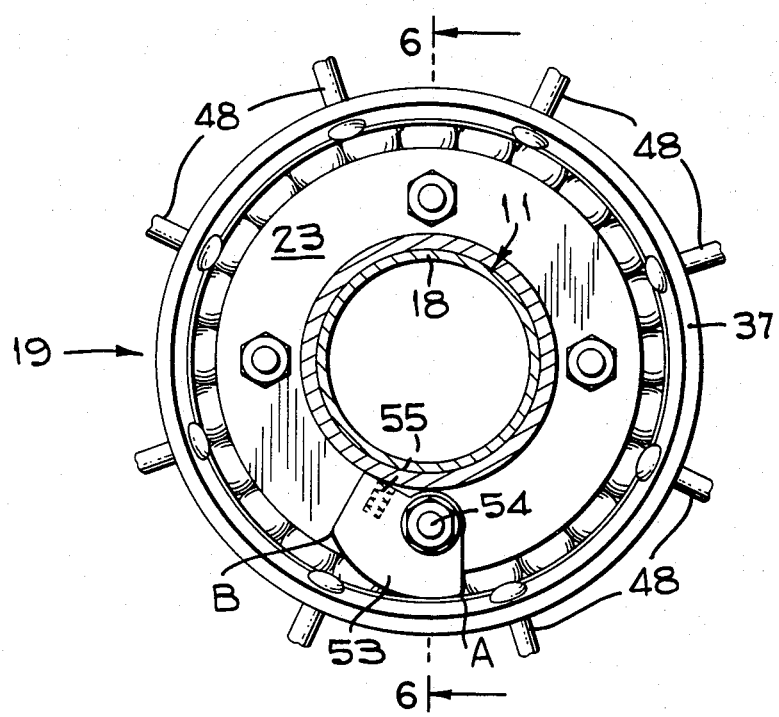
FIG_5
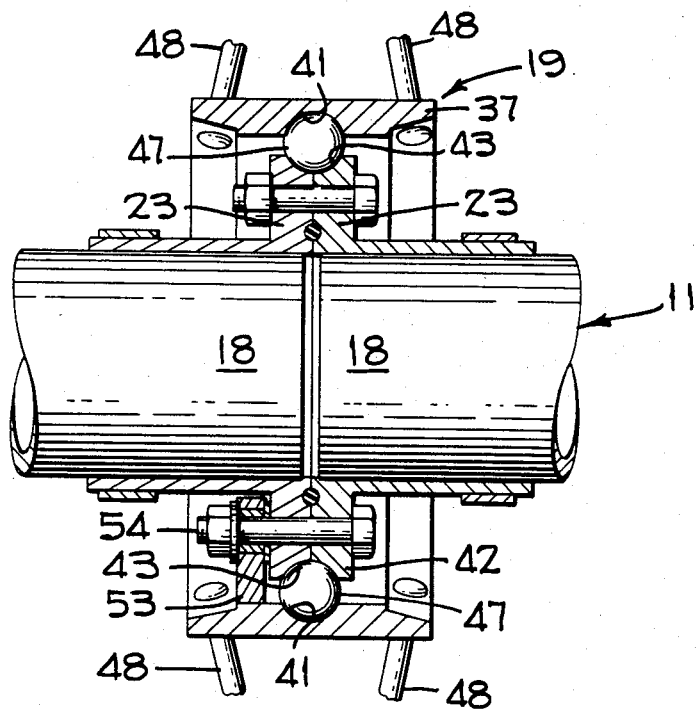
FIG_6

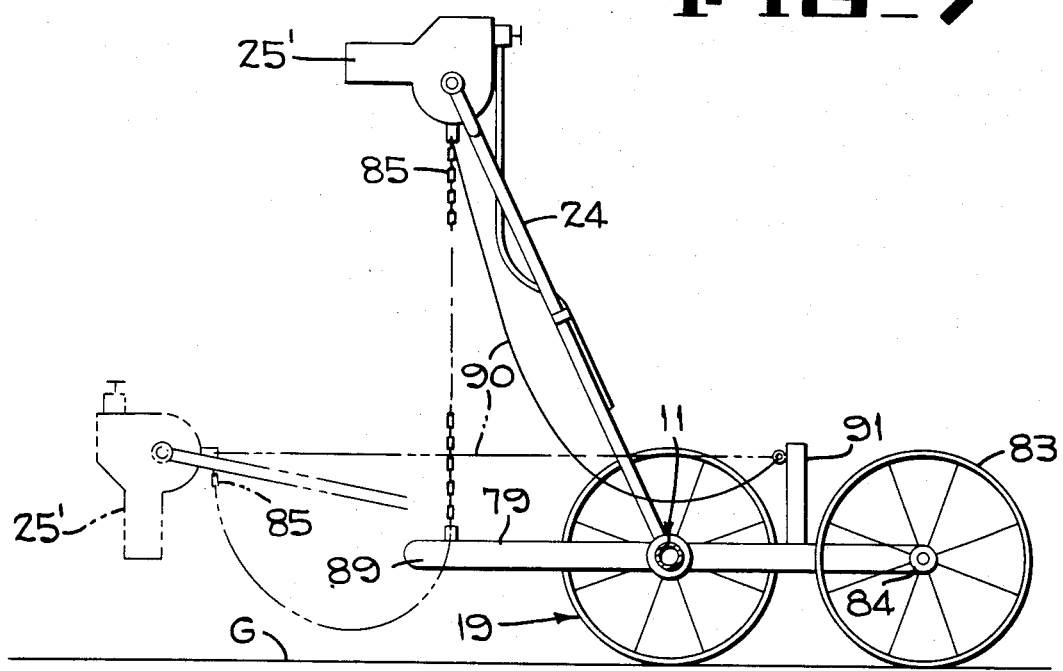
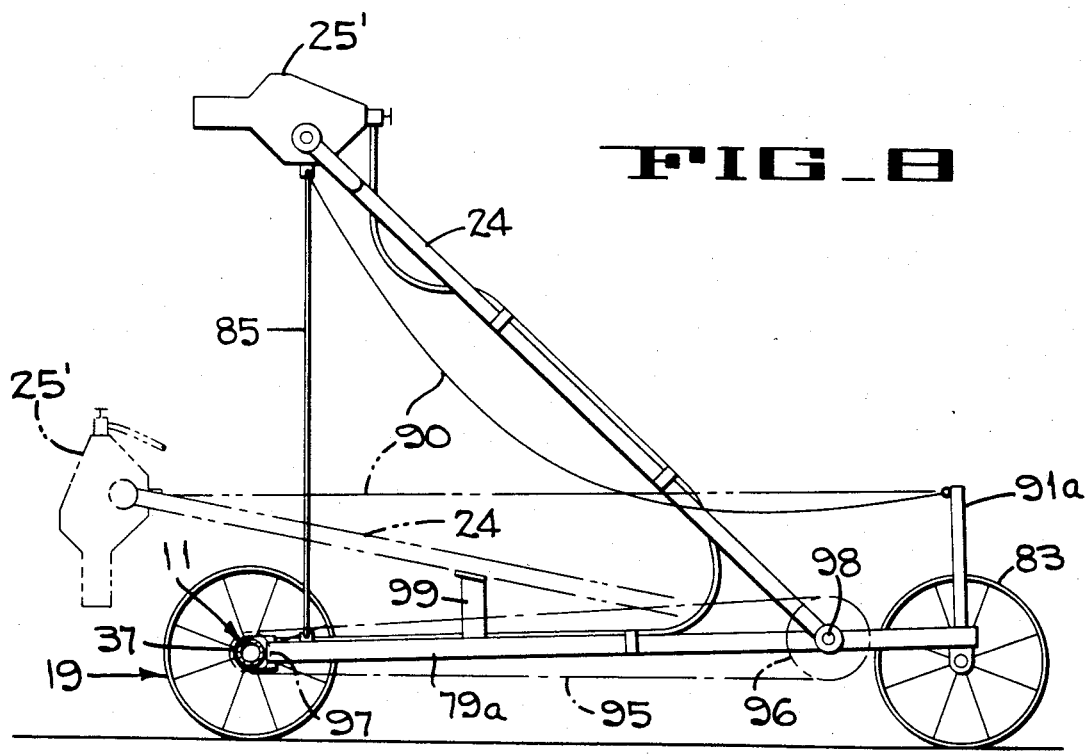

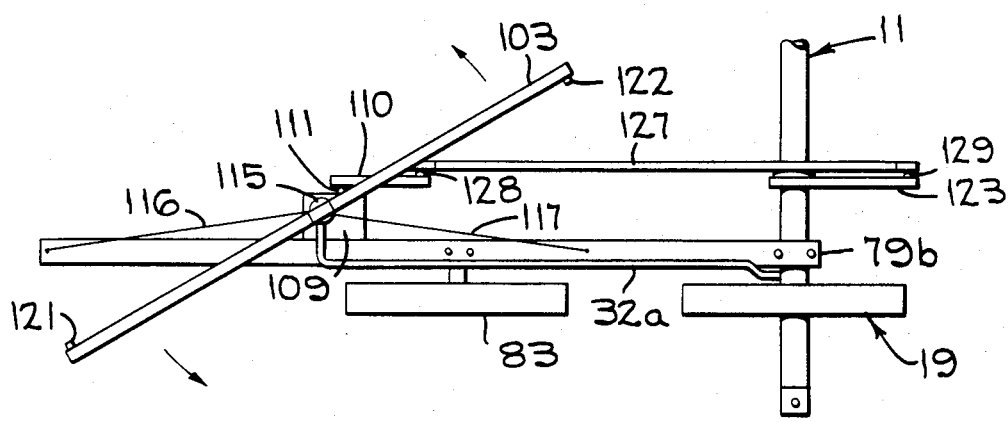
FIG_9
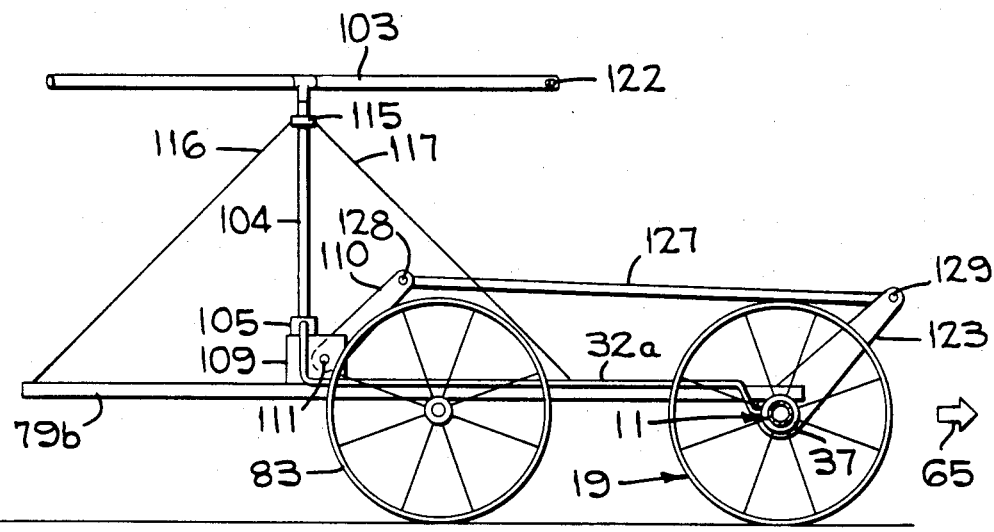
FIG_10

TORQUE DRIVEN IRRIGATION SYSTEM

This application is a division of application Ser. No. 374,566, filed May 3, 1982.

BACKGROUND OF THE INVENTION

1. Field of the Invention

The present invention pertains to movable irrigation systems, and more particularly, to relatively large irrigation systems which are arranged to be connected to a fixed water supply and to move about the water supply under power supplied by the pressure from the water supply.

2. Description of the Prior Art

Typical irrigation systems include a ditch and furrow type of irrigation system, a flooding type of irrigation system and a sprinkling type of irrigation system. The flooding type and the ditch and furrow type of irrigation systems may be used where the fields are relatively level or have a general slope. The sprinkling type of irrigation may be used with land which does not lend itself to the other types of irrigation or wherein the cost of other systems is relatively high. Sprinkling also has the advantage of having less crusting of the soil, and, as a result the water soaks into the soil faster and results in less evaporation of water than where flooding is used. In many areas of the world the sprinkling system is less expensive to build and operate than the other types of irrigation systems.

Typically the sprinkling systems a string of interconnected pipe sections having sprinkler heads, or other water spreading means, arranged at spaced intervals along the length thereof and with support wheels being provided for the pipe sections at generally uniformly spaced intervals along the length of the pipe. The wheels may be arranged to support the pipe sections so that they pass through the axis of the wheels, or the wheels may be mounted on carriages for supporting the pipe sections at an offset position. In either case, the pipe sections and their associated sprinkler heads are supported at a fixed distance above the ground so that they will be above the crop which is to be irrigated. Some means is typically provided to move the string of pipe sections along the area to be sprinkled with the wheels rolling along in predetermined tracks. This movement can be either linear or it can be rotary, i.e., the pipe string can rotate about a central pivot axis where an upstanding water supply pipe is located to which one end of the pipe string is attached.

In the rotary movement type of irrigation system, the interconnected string of pipe sections extends radially from the water supply pipe and is driven either by means of the carriages which support the pipe sections at spaced intervals or by means of a single power mover connected to the string of pipe sections at or near the outer end thereof. The power for the single power mover means may be provided by an electric battery, a gasoline driven engine, or through an electrical power line running along the length of the irrigation tubing and connected to an electrical outlet at the inner, fixed end thereof. Alternately, the power mover may be powered directly through the water pressure in the pipe sections.

The water driven irrigation system has the obvious advantage of not requiring a separate power source to move the pipe over the irrigation area. Such a system has found to be workable as the drive means can be geared to operate at a very low ground speed so that the total area being irrigated will be provided with sufficient water. Typically, the string of interconnected pipe sections makes one complete revolution in the time normally required between waterings (about eight days); hence, the entire length of irrigation tubing need only be continuously driven at a rate so as to make one revolution about the central water supply pipe every eight days.

Hydraulically power driven rotary irrigation systems, which operate under the water pressure in the irrigation tubing may include a single power mover connected at the outer end of the tubing, or they may include a plurality of movers located at support carriage assemblies along the length of the tubing. When a single mover is used the tubing bends due to a drag on the support assemblies caused by rolling resistance between the ground and wheels on the carriage assemblies, so heavy and expensive tubing must be used to prevent the tubing from bending and collapsing.

When a plurality of power movers are spaced along a length of the tubing the outer mover must be designed to move at a greater rate than the inner movers. It is difficult to cause each of the movers to advance at the proper rate as the tubing moves in a circle about a fixed central water supply.

SUMMARY OF THE INVENTION

The present invention alleviates some of the disadvantages of the prior art by providing an irrigation pipe connected for rotation about a water source at an inboard end. An inboard end of the irrigation pipe is connected to a fixed water supply pipe so the irrigation pipe cannot rotate about the longitudinal axis of the irrigation pipe but the irrigation pipe can move about the water supply pipe. A means is provided at or near the outboard end for inducing a torque in the irrigation pipe about its longitudinal axis by rotating the outer end of the irrigation pipe about its longitudinal axis. The amount of rotation of the irrigation pipe is proportional to its distance from the fixed water supply pipe. The torque so induced serves as an energy source for driving a plurality of individual support assemblies located at spaced intervals along the pipe, with the support assemblies having a common axis with the pipe. The support assemblies are adapted to rotate about the common axis in one direction only and the pipe is advanced about the water source by periodic applications of the torque at the outer end of the pipe. A means is provided for using the induced torque to advance the support assemblies in measured incremental distances about the water source. The distances that the support assemblies advance about the water source is proportional to the distances from the fixed water supply pipe.

In one form of the invention, the means for inducing a torque in the irrigation pipe comprises a lever arm mounted on the outboard end of the irrigation pipe and perpendicularly thereto, a reservoir mounted at the free end of the lever arm and elevated from the ground, and means for alternately filling and draining the reservoir with water so that the reservoir alternately raises and lowers, imparting a cyclicly torque to the irrigation pipe. The support assemblies comprise a plurality of wheels, each wheel having a hub at its center which receives the irrigation pipe therethrough and which is adapted to allow the pipe to freely rotate relative to the wheel in one direction only. The hub is disposed so that the irrigation pipe rotates freely during the interval when the water reservoir fills but is grasped by the hub during the interval when the water is released from the reservoir. The wheels are thereby driven forward during the interval when the water is released from the reservoir and the irrigation pipe is advanced about the water source with each wheel driven forward a distance proportional to the distance between the wheel and the water source. A chain or other restraining device limits the amount of rotation in the advancing direction so that the support assembly advances in measured incremental distances about the water source.

An alternate embodiment of the present invention includes a shaft connected to a water powered rotor arm having a plurality of jet openings adjacent the ends of the arms. Pressurized water expelled from the jets causes the arm to rotate the shaft which drives a reciprocating lever and imparts a cyclic torque to the irrigation pipe. Each time the reciprocating lever moves forward the support wheels rotate and advance the irrigation pipe about the water source.

BRIEF DESCRIPTION OF THE DRAWINGS

FIG. 1 is a plan view illustrating the irrigation system of the present invention.

FIG. 2 is an enlarged side elevation of a portion of the rotary irrigation system of FIG. 1 showing one embodiment of the power mover.

FIG. 3 is a perspective of the power mover disclosed in FIG. 2.

FIG. 4 is a vector diagram illustrating the resolution of forces imparted by the wheels of the support assembly of the irrigation system.

FIG. 5 is a detailed view of one of the wheel hubs illustrating the unidirectional clutch mechanism.

FIG. 6 is a section taken along the line 6—6 of FIG. 5.

FIG. 7 is a side elevation of another embodiment of the power mover of the present invention.

FIG. 8 is a side elevation of still another embodiment of the power mover of the present invention.

FIG. 9 is a plan view of another embodiment of the prime mover of the present invention including a water powered rotary arm having a plurality of jet openings adjacent the ends of the arm.

FIG. 10 is a side elevation of the power mover disclosed in FIG. 9.

DESCRIPTION OF THE PREFERRED EMBODIMENT

Referring more particularly to the drawings, FIG. 1 is a plan view of a rotary irrigation system constructed in accordance with the present invention, such system comprising a long length of pipe or irrigation tubing 11 having one end connected to a center pivot assembly 12 and the other end connected to a torque drive assembly 13. The center pivot assembly is arranged to be connected to a source of water and is adapted to direct such water under pressure to the connected length of irrigation tubing which has a plurality of sprinkler openings spaced along the length thereof each of which receives a sprinkler head 17. The sprinkler heads 17 are spaced along the length of the pipe 11 with each of the sprinkler head being arranged to disperse water over a generally circular area of increasing radius moving out along the length of the pipe so that a pie-shaped segment of the field is being irrigated at any instance of time.

The irrigation pipe 11 (FIG. 1) is constructed in a conventional manner wherein it comprises a plurality of interconnected pipe sections 18 (FIG. 6) which are supported by a plurality of wheel support assemblies 19. The pipe sections 18 have flanges 23 at either end and adjoining pipe sections are rigidly connected to each other as illustrated in FIG. 6. The center pivot assembly 12 is arranged so that, while the irrigation pipe 11 is free to travel about the assembly, the inner end 11a of the irrigation pipe is not able to freely rotate about its own longitudinal axis. The irrigation pipe 11 is thus adapted to act as a torsional spring to store the energy used in driving the irrigation system by rotating the outer portion 11b of the pipe about the longitudinal axis of the pipe.

The torque drive assembly 13 (FIGS. 2, 3) includes a lever arm 24 rigidly connected to the outer portion 11b of irrigation pipe 11 and extending perpendicularly therefrom, a water reservoir 25 connected to the outer end of the lever arm 24 by a bracket 29 and by a pair of support pins 30. The support pins 30 are each welded or otherwise connected to an end of the reservoir 25 and the pins each extend through a hole 31 in the bracket 29. A central portion of the bracket 29 is welded or otherwise connected to the outer end of the lever arm 24.

A water supply line 32 having a flow regulating valve 33 therein (FIG. 2) is connected between the reservoir 25 and the irrigation pipe 11 to fill the reservoir with water. As the reservoir 25 fills with water the reservoir and the lever arm 24 move counterclockwise about the pipe 11 (FIG. 2) from the uppermost position shown in the phantom lines of FIG. 2 to the dotted line position thereby exerting a torque which rotates the outboard end of the pipe 11 and stores energy in the pipe by winding up the pipe. During this time the pipe 11 is free to rotate inside the wheel assembly 19 while the wheels remain stationary. The weight of the water then causes the reservoir 25 to tilt about the support pins 30 into the solid line position shown (FIG. 2) and to dump the water on the ground and decrease the weight in the reservoir. A distribution pipe 35 (FIGS. 2, 3) having a plurality of holes (not shown) is connected to a rear portion 25a of the reservoir to distribute the water more evenly along the ground. A dumping foot 36 pivotally connected to a front portion 25b of the reservoir aids in tilting the reservoir to dump the water as the reservoir 25 approaches the ground G.

After the water is dumped the pipe 11 unwinds as the energy stored as torque in the pipe causes the outboard end of the pipe to rotate (FIG. 2) in a clockwise direction. The design of the wheel support assemblies 19 allows the potential energy stored in the irrigation pipe 11 to be converted into kinetic energy in the form of forward motion of the irrigation pipe. As illustrated in FIGS. 5 and 6 each wheel support assembly 19 comprises a cylindrical hub 37 having a bearing race 41 formed about the interior surface thereof, an annular ring 42 formed about the irrigation pipe 11 by the flanges 23 on adjacent pipe sections 18, said annular ring having a second bearing race 43 formed therein, and a plurality of plastic balls 47 retained between the first bearing race 41 and the second bearing race 43, said balls adapted to allow the free rotation of the wheel hub 37 relative to the irrigation pipe 11. The wheel support assemblies 19 are conventional and typical for irrigations of the type wherein the irrigation pipe passes through the axis of the support wheel. The support assembly also includes spokes 48 and a wheel rim 49 attached to the wheel hub 37 as shown in FIG. 2, both of which are also of conventional construction.

For the present invention, it is necessary that the wheel hub 37 rotate freely only in one direction relative to the irrigation pipe 11 and that rotation of the wheel hub 37 in the opposite direction relative to the pipe 11 must be prevented. Thus, it is necessary to provide some type of latching mechanism which operates in one direction only. Many such systems are available and work equally well. For example, a clutch similar to the "sprague" automotive clutch would be adequate, a spiral spring attached to one end of the hub and wound around the irrigation pipe would also work since rotation in one direction would restrict the spring around the pipe and prevent rotation. The preferred embodiment of the present invention utilizes a single wedge-type clutch, as illustrated in FIGS. 5 and 6.

The single wedge-type clutch consists of a cam member 53 mounted on a flange bolt 54 (FIGS. 5, 6) and free to rotate thereabout. A spring 55 urges a cam member in a counterclockwise direction about the bolt 54 as viewed in FIG. 5 to maintain the cam member in contact with the hub 37. The radius of the cam 53 increases from the point A on the contact surface until it reaches a maximum at point B. Thus, as the cam member is rotated in a counterclockwise direction about its axis, the cam surface is pressed more tightly against the inner surface of the wheel hub 37. As the cam member 53 is rotated in the opposite or clockwise direction about its own axis, however, contact is reduced between the cam surface and the hub 37 so the cam member is free to slide over the surface of the hub.

With the single wedge-type clutch, as illustrated in FIGS. 5 and 6, the pipe 11 is free to rotate within the wheel hub 37 in the counterclockwise direction only as viewed in FIG. 5. If the pipe 11 is rotated in a clockwise direction, the frictional forces between the cam surface and the wheel hub 37 will tend to rotate the cam member 53 in a counterclockwise direction about its own axis thereby causing the cam surface to engage and rotate the wheel hub in the clockwise direction. This rotation of the wheel hub 37 causes the entire wheel to rotate and travel along the ground to drive the individual wheel assemblies 19 in a forward direction as indicated by the arrow 65 in FIGS. 1 and 2 to advance the pipe 11 about the central pivot assembly 12.

A control bar 59 (FIG. 2) limits the amount of rotation of the pipe 11 and of the wheel 37 each time the pipe is advanced about the center pivot assembly 12. The control bar 59 includes a wide foot portion 60, and a shank portion 61 having an inner end thereof rigidly attached to the irrigation pipe 11. Each time the wheel assembly 19 rotates in a clockwise direction the control bar 59 rotates from the solid line position shown in FIG. 2 to the dotted line position wherein the foot portion 60 contacts the ground G and prevents further rotation of the wheel assembly 19 and the pipe 11.

A sequence of operation begins with the lever arm 24 in the elevated position shown in the phantom line of FIG. 2 and with the water reservoir 25 substantially empty so that the reservoir is in a horizontal position. To insure that the lever arm 24 and the reservoir 25 start in the elevated position, the irrigation pipe 11 must be prestressed by rotating the outer portion 11b (FIG. 2) several degrees in a counterclockwise direction before securing the lever arm 24 to the irrigation pipe 11. The amount of prestress rotation is determined by the length and composition of the irrigation pipe 11, and such prestress must be sufficient to overcome the rolling resistance of all of the wheels in the support assemblies 19. Water constantly enters the reservoir 25 through the water supply line 32 and the reservoir 25 begins to fill. As the weight of the water in the reservoir increases, the downward force on the lever arm 24 increases causing the torque on the irrigation pipe to increase and the reservoir 25 gradually moves down to the lower position shown in the dotted lines of FIG. 2. The angular displacement of the lever arm 24 causes the pipe 11 (FIG. 1) to twist by varying degrees along its length with the maximum twist being located at the outer end 11b of the irrigation pipe 11. This rotation is in the counterclockwise direction (as viewed in FIG. 2) and the cam member 53 of each wheel support assembly 19 is oriented so that the pipe 11 rotates freely within each of the wheel hubs 37 and the system as a whole remains in place during the filling of the reservoir 25. Note that as viewed in FIG. 5, the pipe 11 is free to rotate in the clockwise direction and that the view shown in FIG. 2 is taken in the same direction. The weight of the water in the reservoir 25 below the support pins 30 causes the reservoir to slowly pivot about the pins 30 and retains the reservoir 25 in the horizontal position until the water level rises above the pins 30.

When the water rises above the pins 30, the weight of the water in the rear portion 25a of the reservoir causes the reservoir 25 to pivot sharply about the pin 30 and to dump the water on the ground through the distribution pipe 35, thereby decreasing the torque on the lever arm 24. The dumping foot 36 insures that the reservoir will promptly dump the water. The energy stored in the pipe 11 causes the pipe (FIG. 2) to rotate clockwise causing the cam member 53 (FIG. 5) in each of the wheel assemblies 19 to grasp the wheel hub 37 and to rotate the wheel support assembly 19 (FIG. 2) counterclockwise and move the wheels and the pipe 11 in a forward direction indicated by the arrow 65 (FIGS. 1, 2).

Note that the present invention compensates for the greater distance that must be traveled by the outer end of the irrigation pipe 11. By twisting the pipe from the outer end, the amount of rotational displacement experienced by the pipe decreases as the location on the pipe approaches the center pivot assembly 12, thus the amount the wheel hub 37 is rotated upon the release of tension also decreases as the position of the wheel support assembly 19 is closer to the center pivot assembly 12. A wheel located half the distance down the irrigation pipe will move forward an amount half that of a wheel located at the outer end of the irrigation pipe. Since the full circumference to be traveled by each wheel assembly is a direct function of the distance of that assembly from the center, it can be seen that the torque drive system compensates automatically and precisely for the varying distances that the wheel assemblies travel.

The ability of the irrigation system of the present invention to advance in a straight line about the center pivot assembly 12 is true only when the ground traveled is perfectly level. It will be appreciated that when the ground contour varies, the distance traveled by each wheel also varies and that such small variations can lead to severe misalignment of the irrigation pipe 11. To overcome this it has been found desirable to maintain an arcuate profile across the advancing irrigation line, as best seen in FIG. 1. The irrigation system advances in the direction of the arrow 65 with the center of the irrigation line somewhere ahead of the center line 66 drawn between the pivot point 12 and the far end of the irrigation pipe 11b. The result of this arcuate profile is to provide a self-correcting tension on the line which tends to retain the profile.

The two forces on the irrigation line which are in tension are provided by the wheel support assemblies 19 and by a lever arm 71 mounted substantially at the middle of the irrigation pipe to advance the center portion of the pipe 11 ahead of either end. Referring to FIG. 2, it can be seen that when the torque drive assembly 13 is lowered prior to release of the water, the center lever 71 is in a vertical position. In this position the arm 71, and an associated weight 72 at the end of the arm are balanced and provide no torque to the irrigation pipe 11. As the torque drive assembly 13 rises and releases tension on the pipe 11, however, the central lever arm 71 is displaced forward and becomes no longer balanced. The lever arm imparts an additional clockwise torque at the center of the irrigation pipe 11 which tends to rotate the wheels in a forward direction. As this additional torque is experienced primarily near the middle of the pipe 11, the wheels near the middle turn more than they otherwise would. Thus, the wheels near the center of the pipe tend to advance at a greater angular velocity about the central pivot point than the wheels at either end. If this were the only force at work, the irrigation pipe would quickly become misaligned with the outer end 11b trailing badly and falling in toward the center 12. However, a second force balances the first and acts to maintain the arcuate profile as shown in FIG. 1.

The second force lies in the outward radial direction and is provided by each of the wheels along the length of the irrigation pipe 11. Note that as long as the pipe 11 lies along the center line 66, the direction of each wheel is precisely in the direction of advance of the irrigation pipe. As soon as the center of the tubing advances ahead of the center line, however, the direction of the wheels diverge with the wheels pointing away from the center pivot point 12. The force provided by the forward motion of each of the wheels no longer acts solely to advance the irrigation pipe 11 and a radial force is introduced.

This radial force is illustrated by the vector diagram of FIG. 4. Arrow 73 represents the force F provided by a wheel disposed perpendicularly to the center line of the irrigation system. This force resolves into a single component in the direction of travel, i.e., normal to the center line. However, as soon as the wheel is directed away from the center of the irrigation system, as represented by arrows 77 and 78, the force resolves into two components, i.e., a forward component $F_f$ and a radial component $F_r$ directed away from the center pivot assembly 12. Furthermore, the greater the divergence of the wheel from the forward direction, the greater becomes the radial force imparted on the irrigation pipe 11. The aggregate of the radial forces provided by each of the wheel assemblies tends to straighten the irrigation pipe 11 in opposition to the first force which tends to advance the central portion.

Note that as the advance of the central portion increases, the outer wheels are directed further away from the central pivot. This in turn causes a greater radial force to counteract the advance of the central section of the pipe. Thus, a tension is maintained between the forces resulting in the convex arcuate profile of the irrigation pipe 11 as seen in the plan view of FIG. 1.

Since the irrigation pipe 11 rotates back and forth during each drive cycle, each sprinkler head 17 must be rotatably mounted in order to maintain a substantially vertical orientation during operation of the system. Such rotatable connections are well known in the art and manufacturers by companies including Pierce Irrigation Corporation, Eugene, Oreg. and Wade Manufacturing Company, Portland, Oreg. At each sprinkler head 17 located on the pipe 11, a pipe riser (not shown) extends upward a distance of approximately one foot. The sprinkler head 17 is rotatably mounted at the upper end of the riser and a plumb weight extending downward from the sprinkler head 17 acts to maintain the sprinkler head in a vertical orientation at all times.

Another means for advancing the center portion of the irrigation pipe somewhat ahead of the far end 11b is to increase the diameter of the wheels mounted on the central portion of the pipe. This can be done by using special oversize wheels or by mounting a rope or hose around the outer rim of the wheels to increase their diameter slightly.

Another embodiment of the present invention disclosed in FIG. 7 includes means for accurately controlling the amount of rotation of the outer end 11b of the irrigation pipe and means for dumping water from the reservoir at a predetermined distance above ground. A horizontal frame member 79 is connected to the outer wheel assembly 19 and a gauge wheel 83 is rotatatably connected to a front portion 84 of the frame member to retain the frame member 79 in a generally horizontal position. A chain 85 connected between the reservoir 25' and a rear portion 89 of the frame member limits the upper rotation of the lever arm 24 and limits the forward rotation of the outer end 11b of the irrigation pipe. A reservoir control cable 90 connected between the reservoir 25' and a vertical frame member 91 causes the reservoir 25' to dump at a predetermined distance above the ground G.

The embodiment disclosed in FIG. 8 is similar to the embodiment of FIG. 7 except the angular movement of the lever arm 24 is multiplied by a drive chain 95 connected between a pair of sprockets 96, 97. The larger drive sprocket 96 is connected to the lower end of the lever arm 24 and the lever arm and drive sprocket 96 are rotatably connected to the frame member 79a by a shaft 98. The smaller sprocket 97 is connected to the hub 37 of the wheel support assembly 19. Each time the lever arm 24 moves from lower position shown in the phantom lines of FIG. 8 to the solid line position, the smaller sprocket 97 and the drive wheel 19 rotate approximately twice as many degrees as the sprocket 96 rotates. This ratio can obviously be changed by changing the relative diameters of the sprockets 96, 97 to change the rate at which the irrigation pipe 11 travels about the center pivot 12 (FIG. 1). A vertical stop member 99 limits the downward travel of the lever arm 24.

Another embodiment of the present invention disclosed in FIGS. 9 and 10 uses a jet powered tubular rotor 103 to provide torque for winding up the irrigation pipe 11. The rotor 103 is connected to a rotatable conduit 104 with the lower end of the conduit connected to the rotatable input 105 of a worm reducer 109. The output of the worm reducer is connected to a crank arm 110 so the crank arm is rotatable about a pivot 111. An upper portion of the conduit 104 is rotatably mounted in a slip collar 115 and secured in an upright position by a pair of braces 116, 117. Water is coupled to the conduit 104 by a water supply line 32a connected between the conduit 104 and the pipe 11. Pressurized water emitted from a pair of jets 121, 122 causes the rotor 103 to rotate counterclockwise (FIG. 9) causing the crank arm 110 to rotate about the pivot 111. The outer end of the crank arm 110 (FIGS. 9, 10) is pivotally connected to an arm 123 by a connecting rod 127 and by a pair of pins 128, 129. The inner end of the arm 123 is secured to the irrigation pipe 11 by the cylindrical hub 37. Since the crank arm 110 is somewhat shorter than the arm 123, the arm 123 moves back and forth through an arc of approximately 90 degrees as the arm 110 rotates in a complete circle about the pivot 111. Each time the arm 123 moves counterclockwise from the forward position shown in FIG. 10, the outer end of the irrigation pipe 11 is rotated counterclockwise freely within the wheel hub 37. Each time the arm 123 moves back toward the forward position of FIG. 10 the wheel hub 37 grasps the irrigation pipe 11 and the energy stored in the pipe causes the pipe to rotate the wheel hub 37 and the wheel assembly 19 (FIG. 10) thereby driving the pipe and assembly 19 in the forward direction shown by the arrow 65. Each time the arm 123 moves through 90 degrees in the forward direction the wheel assembly moves a predetermined distance in the forward direction.

The present invention includes apparatus for insuring that the irrigation pipe advances in uniform incremental distances about a water source. The irrigation pipe is alternately wound up and allowed to unwind, with each unwinding action causing the pipe to advance a predetermined uniform distance.

The present invention can be easily modified so the advance of the pipe 11 about the center pivot assembly 12 will occur during the interval while the reservoir 25 (FIG. 2) is filling rather than during the interval while the emptying reservoir is returning to the uppermost position. This is accomplished by reversing the cam member 53 on each of the wheel support assemblies 19 so the hub 37 is free to rotate in the clockwise direction rather than the counterclockwise direction, as viewed in FIGS. 2 and 5. With this configuration, the irrigation pipe will rotate freely inside each of the hub 37 while the reservoir 25 is emptying and will drive the hubs 37 while the reservoir is filling.

Although the best mode contemplated for carrying out the present invention has been herein shown and described, it will be apparent that modification and variation may be made without departing from what is regarded to be the subject matter of the invention.

What is claimed is:

1. A self-propelled rotary irrigation system for connection at one end to a source of water located at the center of an area to be irrigated, said system comprising:
   a length of pipe for carrying water, said pipe having a longitudinal axis;
   a plurality of irrigation outlets arranged in spaced relationship along said length of pipe for discharging water therefrom;
   means for mounting said pipe with said longitudinal axis of said pipe in a generally horizontal plane;
   means for connecting a first end of said pipe to said water source in a manner such that the length of pipe is free to travel about said source and such that said first end is unable to rotate about said longitudinal axis of said pipe;
   a first sprocket rotatably mounted adjacent to a second end of said pipe;
   drive means powered by water from said pipe for alternately rotating said first sprocket in a first direction and in a second direction;
   a second sprocket connected to said second end of said pipe;
   a drive chain connected between said first and said second sprockets for alternately inducing and releasing a rotational torque about said longitudinal axis as said first sprocket rotates in alternate directions with the torque applied to a portion of said pipe adjacent a second end of said pipe, said rotational torque causing said pipe to rotate about said longitudinal axis with the amount of rotation of said pipe being proportional to the distance from said first end, the relative sizes of said first and said second sprockets causing said second end of said pipe to rotate through a much larger angle than the rotation of said first sprocket;
   wheel means located at spaced intervals along the length of said pipe for supporting and advancing the pipe;
   ratchet means connected between said wheel means and said pipe for allowing said pipe to rotate relative to said wheel means in a first direction and for securing said pipe to said wheel means as said pipe rotates in a second direction causing said wheel means to advance said pipe about said water source; and
   means for limiting the rotational movement of said pipe to insure that said wheel means advances said pipe in substantially equal increments each time said pipe rotates in said second direction.

2. A self-propelled rotary irrigation system for connection at one end to a source of water located at the center of an area to be irrigated, said system comprising:
   a length of pipe for carrying water, said pipe having a longitudinal axis;
   a plurality of irrigation outlets arranged in spaced relationship along said length of pipe for discharging water therefrom;
   means for mounting said pipe with said longitudinal axis of said pipe in a generally horizontal plane;
   means for connecting a first end of said pipe to said water source in a manner such that the length of pipe is free to travel about said source and that said first end is unable to rotate about said longitudinal axis of said pipe;
   a jet rotor connected to said pipe and propelled by water from said pipe;
   a crank arm connected to said rotor with a first end of said crank arm mounted on a pivot for rotational movement about said pivot;
   a reciprocating arm having a first end thereof connected to said pipe at right angles to said pipe axis, said reciprocating arm having a length greater than the length of said crank arm;
   a connecting rod connected between a second end of said crank arm and a second end of said reciprocating arm, the relative lengths of said crank arm and said reciprocating arm causing said reciprocating arm to pivot back and forth through an angle of more than 90 degrees as said crank arm rotates through 360 degrees, said reciprocating arm alternately inducing and releasing a rotational torque about said longitudinal axis as said rotor revolves with the torque applied to a portion of said pipe adjacent a second end of said pipe, said rotational torque causing said pipe to rotate about said longitudinal axis with the amount of rotation of said pipe being proportional to the distance from said first end;

wheel means located at spaced intervals along the length of said pipe for supporting and advancing the pipe; and ratchet means connected between said wheel means and said pipe for allowing said pipe to rotate relative to said wheel means in a first direction and for securing said pipe to said wheel means as said pipe rotates in a second direction causing said wheel means to advance said pipe about said water source.

3. A self-propelled rotary system as defined in claim 2 wherein said relative lengths of said crank arm and said reciprocating arm cause said reciprocating arm to pivot less than 180 degrees as said crank arm rotates 360 degrees.

* * * * *